(12) United States Patent
Leger

(10) Patent No.: US 11,971,063 B2
(45) Date of Patent: Apr. 30, 2024

(54) TITANIUM ALLOY FASTENER AND MANUFACTURING METHOD

(71) Applicant: LISI AEROSPACE, Paris (FR)

(72) Inventor: Guillaume Leger, Villiers-Adam (FR)

(73) Assignee: LISI AEROSPACE, Paris (FR)

( * ) Notice: Subject to any disclaimer, the term of this patent is extended or adjusted under 35 U.S.C. 154(b) by 296 days.

(21) Appl. No.: 17/630,909

(22) PCT Filed: Sep. 15, 2020

(86) PCT No.: PCT/EP2020/075702
§ 371 (c)(1),
(2) Date: Jan. 27, 2022

(87) PCT Pub. No.: WO2021/052929
PCT Pub. Date: Mar. 25, 2021

(65) Prior Publication Data
US 2022/0299061 A1    Sep. 22, 2022

(30) Foreign Application Priority Data

Sep. 16, 2019 (FR) .................................. 1910205

(51) Int. Cl.
*C22C 14/00* (2006.01)
*C22F 1/18* (2006.01)
*F16B 35/00* (2006.01)

(52) U.S. Cl.
CPC ............. *F16B 35/00* (2013.01); *C22C 14/00* (2013.01); *C22F 1/183* (2013.01)

(58) Field of Classification Search
CPC ...... C22C 14/00; C22F 1/183; F16B 25/0052; F16B 35/00; F16B 35/041

(Continued)

(56) References Cited

U.S. PATENT DOCUMENTS

| 7,780,388 B2 * | 8/2010 | Yamaki | ................. F16B 25/10 411/311 |
| 2014/0169911 A1 * | 6/2014 | Sugimoto | ................. C23C 4/18 106/270 |

(Continued)

FOREIGN PATENT DOCUMENTS

| EP | 1492961 | 4/2007 |
| EP | 2406336 | 5/2013 |
| FR | 2940319 | 6/2010 |
| FR | 2947597 | 1/2011 |
| JP | 2016138318 | 8/2016 |

OTHER PUBLICATIONS

Jones N. G. et al., "Development of Chevron-shaped Alpha Precipitates in Zi—5Al—5Mo—5V—3Cr", Scripta Materialia, vol. 60, No. 7, Apr. 1, 2009, pp. 571-573, ISSN: 1359-6462, XP002531688, Elsevier, Amsterdam, Netherlands.

(Continued)

*Primary Examiner* — Roberta S Delisle
(74) *Attorney, Agent, or Firm* — Henricks Slavin LLP

(57) ABSTRACT

The invention relates to a fastener comprising a substantially right circular cylindrical surface arranged along an axis, said surface comprising a grooved shape selected from a thread, a tapping and a plurality of traction grooves, said fastener being made of a beta-metastable titanium alloy. The alloy has a microstructure (40) made up of a matrix (42) and alpha phase nodules (44) distributed in said matrix, the matrix being made up of beta phase and groups (46) of alpha phase lamellae (48) oriented in the same direction.

10 Claims, 15 Drawing Sheets

(58) Field of Classification Search
USPC .................................................. 411/411, 424
See application file for complete search history.

(56) References Cited

U.S. PATENT DOCUMENTS

| | | | | |
|---|---|---|---|---|
| 2015/0028142 A1* | 1/2015 | Coray | ..................... | B02C 17/22 |
| | | | | 241/300 |
| 2015/0204370 A1* | 7/2015 | Serizawa | ............... | H01R 4/304 |
| | | | | 411/411 |
| 2015/0337885 A1* | 11/2015 | Whitlock | .............. | F16B 35/048 |
| | | | | 29/458 |
| 2016/0115989 A1* | 4/2016 | Hubmann | ........... | F16B 25/0015 |
| | | | | 411/411 |
| 2017/0146046 A1 | 5/2017 | Foltz, IV et al. | | |

OTHER PUBLICATIONS

Panza-Giosa, R. et al., "Mechanical properties of heat treated Ti—5Al—5V—5Mo—3Cr: an attempt to Define Critical Properties of Various Microstructural Features", Jun. 26, 2008, p. 1, Retrieved from the Internet: https://asm.confex.com/asm/aero08/techprogram/paper_20872.htm.

González, Junquera, J., Preliminary Search Report, dated May 28, 2020, 2 pages, National Institute of Industrial Property (INPI), Courbevoie, France.

González, Junquera, J., International Search Report, dated Dec. 14, 2020, 3 pages, European Patent Office, Rijswijk, Netherlands.

González, Junquera, J., Written Opinion, 5 pages, European Patent Office, Rijswijk, Netherlands.

* cited by examiner

TITANIUM ALLOY FASTENER AND MANUFACTURING METHOD

CROSS REFERENCE TO RELATED APPLICATIONS

This application is a National Stage of International Application No. PCT/EP2020/075702, filed Sep. 15, 2020, which claims priority from FR1910205 filed Sep. 16, 2019, the entire contents of which are incorporated herein by reference.

The present invention relates to a fastener comprising a substantially cylindrical surface of revolution arranged along an axis, said surface comprising a serrated shape selected from a thread, an internal thread and a plurality of traction grooves, said fastener being made of a beta-metastable titanium alloy.

The invention is particularly applicable to fasteners for assembling aircraft structures.

In the aeronautical field, it is common to use titanium alloy fasteners. The chemical composition alloy Ti-6Al-4V, also referred to as "TA6V", is of very widespread use. This alloy indeed benefits from a low density, of the order of 4.43 kg/dm$^3$.

However, TA6V has an intrinsic mechanical strength limited to about 1250 MPa. Further, for fasteners having a diameter of about 25 mm, the low conductivity of TA6V limits the efficiency of heat treatments. This results in a mechanical strength of less than 1100 MPa.

The fasteners made of Iron or Nickel base alloys generally have improved mechanical strength, but their density is higher than that of titanium fasteners.

A "Beta C" titanium alloy having a Ti-3Al-8V-6Cr-4Mo-4Zr chemical composition makes it possible to achieve mechanical strengths of the order of 1350 MPa for a low density. However, the composition of this alloy makes it very expensive.

According to temperature, pure titanium can have two crystallographic phases: alpha phase ($\alpha$), compact hexagonal structure, or beta phase ($\beta$), centered cubic structure.

The titanium alloys have the property of maintaining at room temperature more or less alpha-phase or beta-phase, which conditions their mechanical properties. In particular, the so-called beta-metastable or $\beta$-metastable alloys have a mechanical strength of up to 1500 MPa, for a density of about 4.7 kg/dm$^3$.

However, the low ductility of the beta-metastable alloys makes their transformation by deformation very sensitive to the manufacturing processes, in particular for the manufacture of aeronautical fasteners.

Thus, rolling-type operations of the external threads or crimping of the internal threads may cause defects in the threads, such as cracks or shear bands. These defects then degrade the mechanical properties of the final part.

Furthermore, the deformation of the metal materials is most often carried out with heating. In the case of beta-metastable alloys, heating can lead to alterations in microstructure, which degrade the mechanical properties of the material.

The purpose of the present invention is to provide a fastener having a low density and a high mechanical strength, while enabling mechanical shaping operations without the occurrence of defects that degrade the properties of the part.

To this end, the invention relates to a fastener of the aforementioned type, in which the alloy has a first microstructure formed of a first matrix and alpha-phase nodules distributed in said first matrix, the first matrix being formed of beta-phase and groups of alpha-phase lamellae oriented in the same direction.

According to other advantageous aspects of the invention, the fastener comprises one or more of the following features, taken individually or following all technically possible combinations:

an average distance between the lamellae of the same group is between 0.08 µm and 0.30 µm;

the beta-metastable titanium alloy comprises by weight between 4 and 6% of aluminum, between 4 and 6% of vanadium, between 4 and 6% of molybdenum and between 2 and 4% of chromium;

the beta-metastable titanium alloy further comprises one or more addition elements, each of said addition elements having a weight percentage of less than 3%, a sum of the weight percentages of said additions elements being less than 6%.

The invention also relates to a method for manufacturing a fastener described above, said method comprising the following steps: providing a fastener blank made of a beta-metastable titanium alloy, said alloy having a second microstructure consisting of a second beta phase matrix and alpha phase nodules distributed in said second matrix, said alloy having a transformation temperature T$\beta$ of the alpha-phase in beta-phase; first heat treatment of the fastener blank, at a first temperature in a range [T$\beta$-100° C.; T$\beta$-10° C.], followed by cooling; then second heat treatment of the fastener blank, at a second temperature of between 440° C. and 600° C.; the method further comprising a step of deforming the fastener blank to perform the serrated shape, after the first heat treatment.

According to other advantageous aspects of the invention, the method comprises one or more of the following features, taken individually or following all technically possible combinations:

the second temperature of the second heat treatment is between 450° C. and 580° C.;

the second microstructure has an area percentage of alpha-phase nodules comprised between 4% and 40%;

the deformation step is carried out at a temperature below 620° C.;

the fastener comprises a thread and the deformation step is carried out by rolling the fastener blank by means of reciprocating flat dies or profiled rolls;

the fastener comprises a tapping and the deformation step is carried out by crimping at least one internal thread of said tapping.

The invention will be better understood upon reading the following description, given solely by way of non-limiting example and made with reference to the drawings in which.

Figure 1:
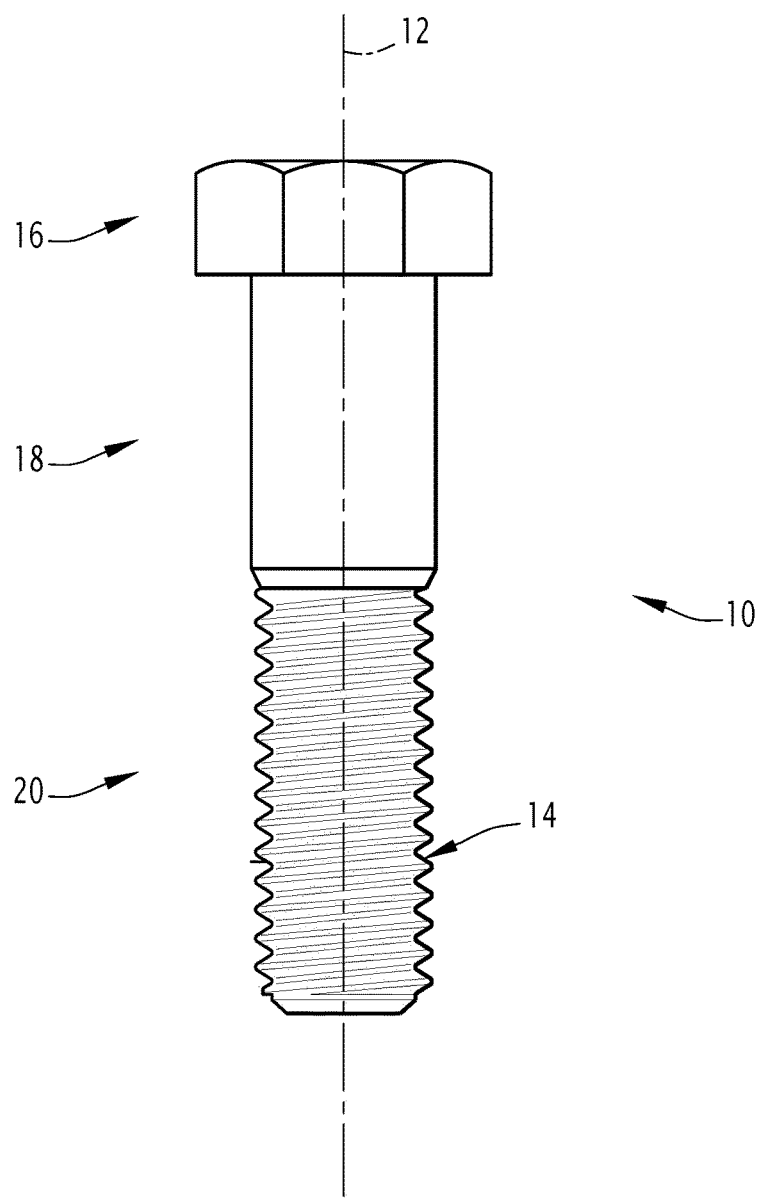
FIG. 1 is a view of a fastener according to a first embodiment of the invention.
Figure 9:
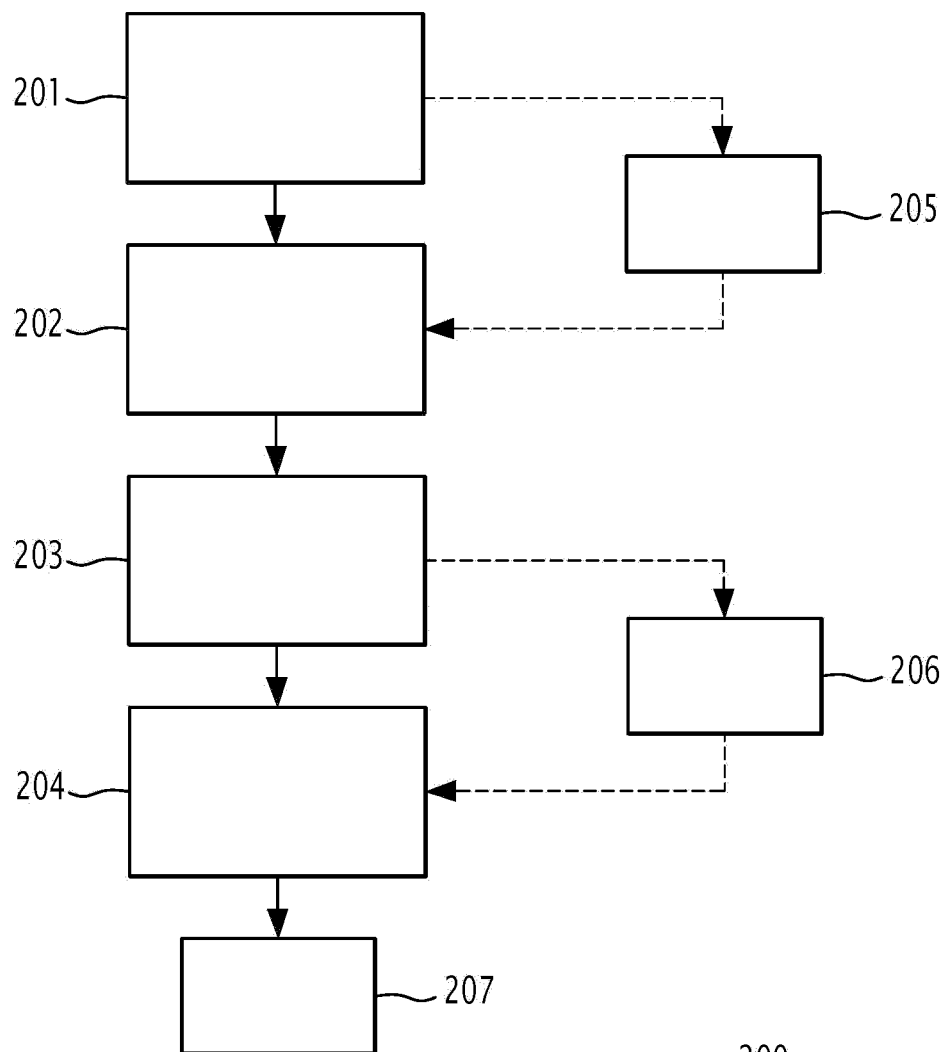
Figure 10:
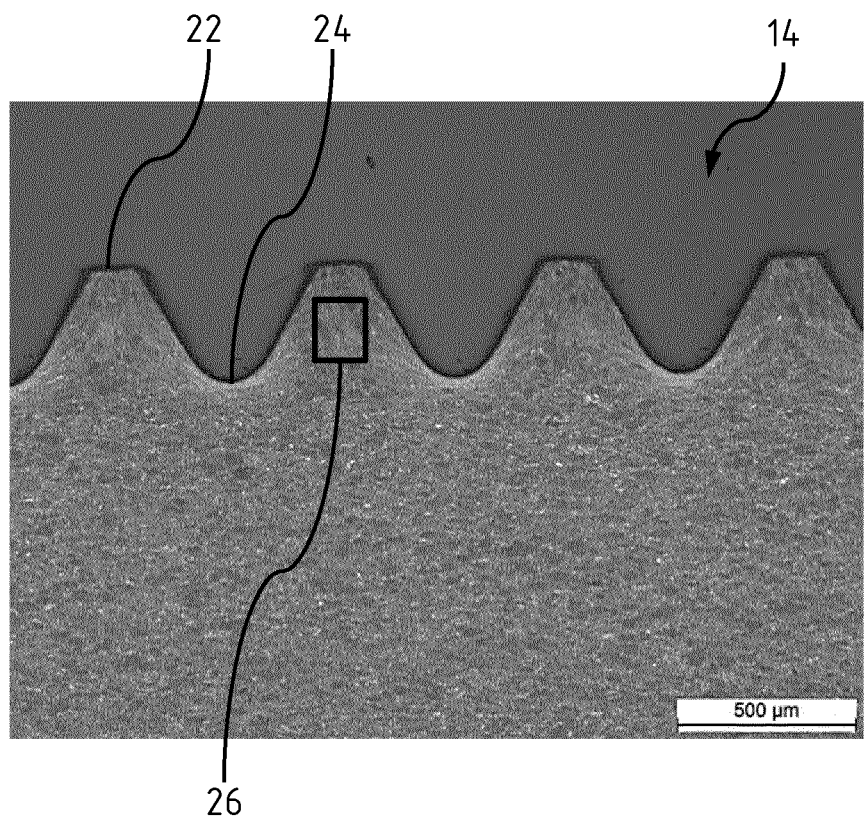
Figure 11:
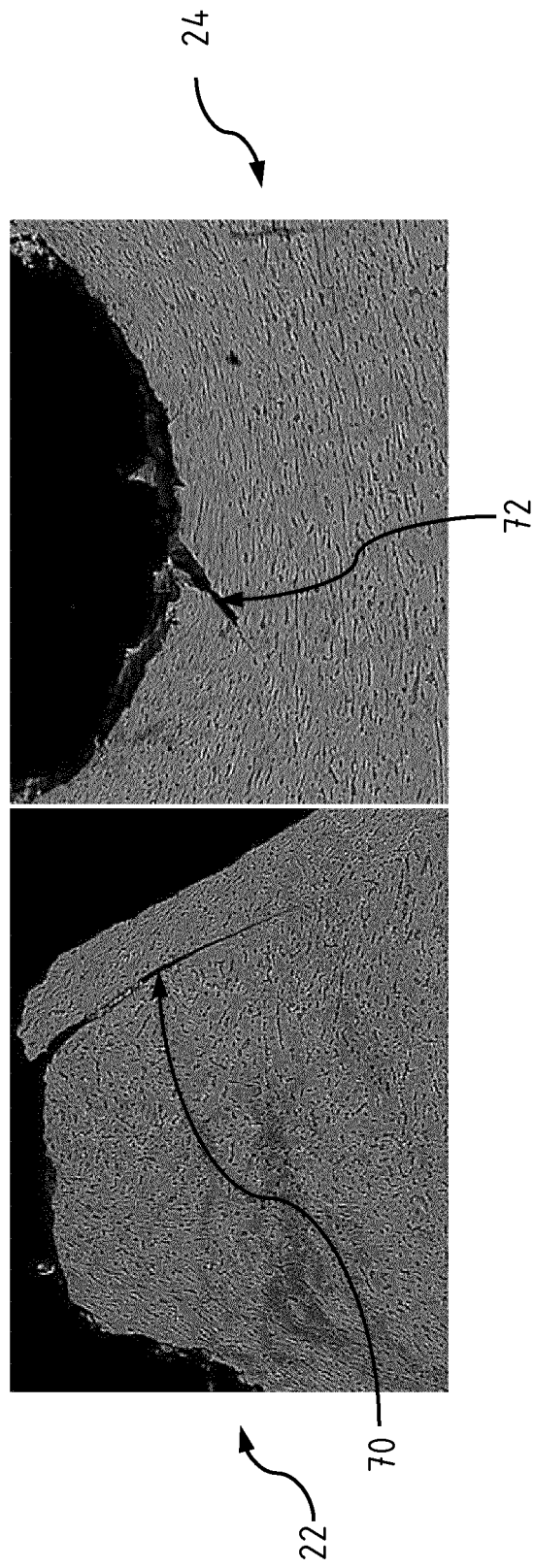
Figure 12:
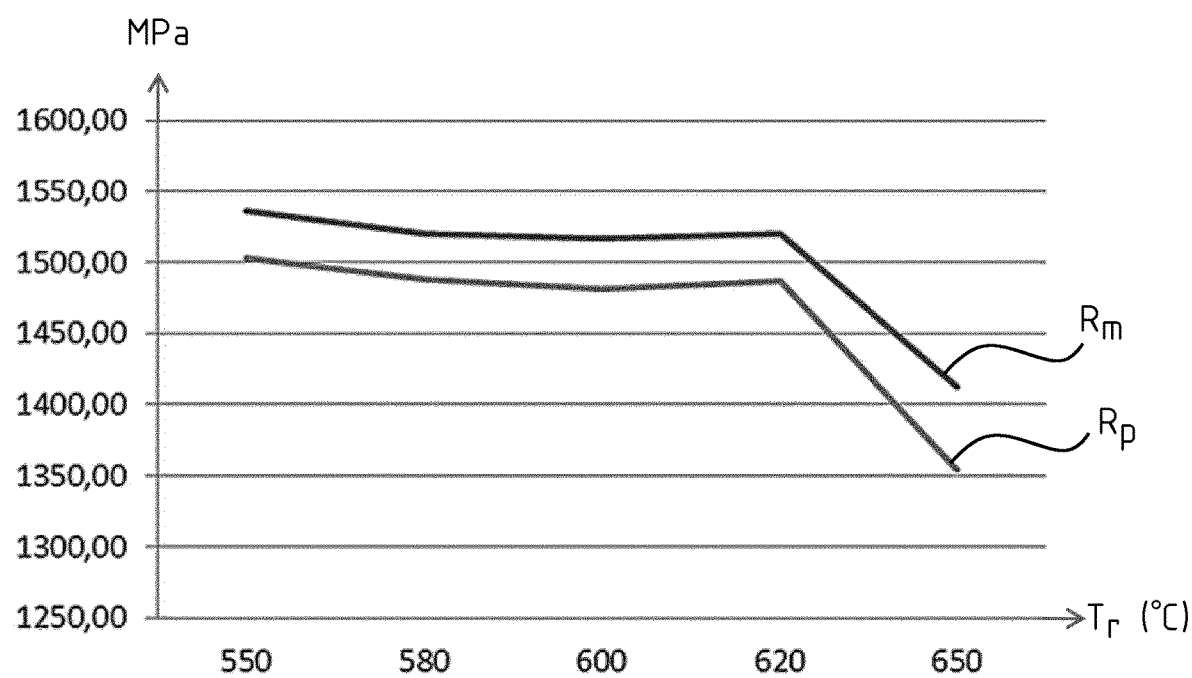
Figure 13:
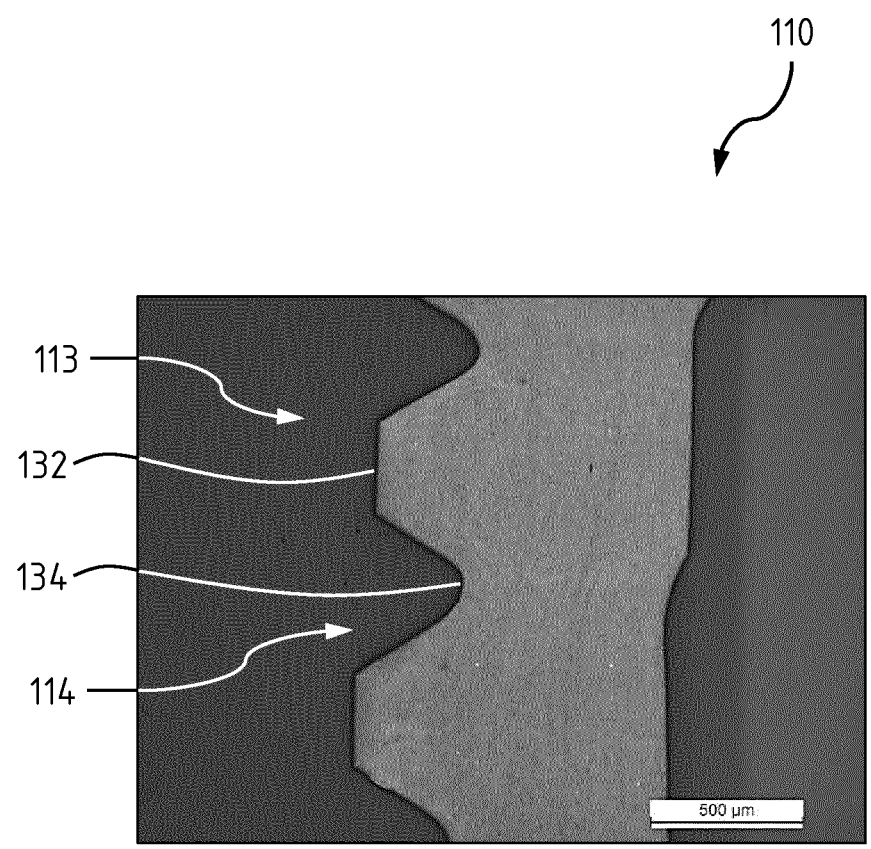
Figure 14:
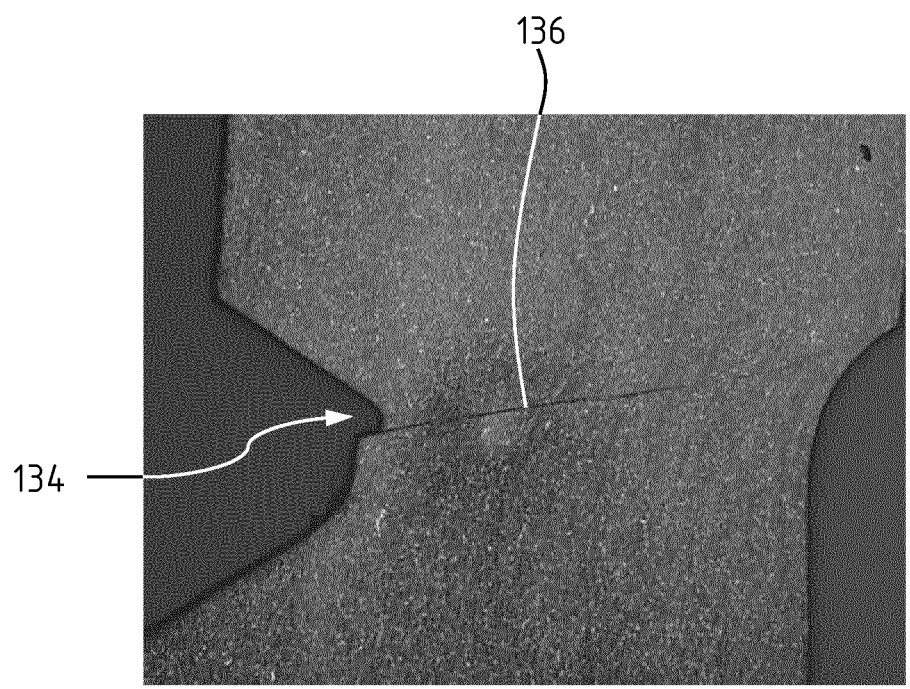
Figure 15:
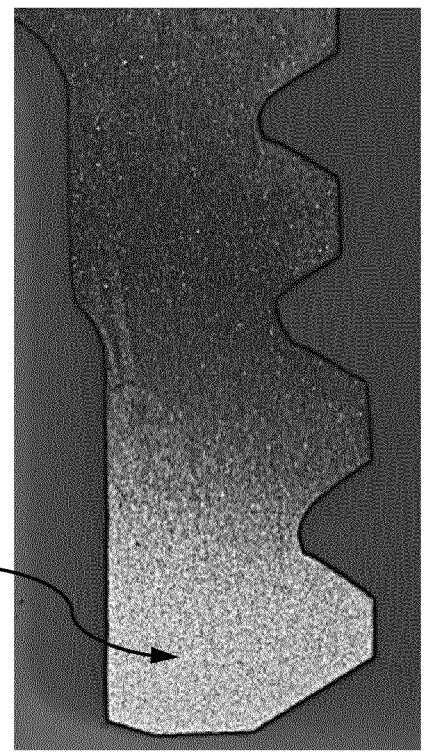

FIG. 9 schematically represents a method for manufacturing a fastener according to an embodiment of the invention;

FIG. 10 is a micro-scale photograph of a microstructure of a fastener similar to the element of FIG. 1;

FIG. 11 is a micro-scale photograph of a fastener manufactured according to a first method;

FIG. 12 is a graphical representation of mechanical strength measurements made on fasteners according to the invention;

FIG. 13 is a micro-scale photograph of a fastener 110 according to a second embodiment of the invention; and FIGS. 14 and 15 are micro-scale photographs of fasteners manufactured according to second and third methods.

FIG. 1 shows a fastener 10 according to a first embodiment of the invention.

The fastener 10 includes a substantially cylindrical surface of revolution arranged along an axis 12. Said surface comprises a serrated shape 14.

More specifically, in the embodiment of FIG. 1, the fastener 10 is a screw comprising a head 16, a smooth shank 18 and a threaded portion 20, adjacent along the axis 12. The serrated shape 14 constitutes the thread of the threaded portion 20 and has a helical shape.

The threaded portion 20 is considered to be "substantially cylindrical of revolution" in the direction in which the vertices of the threads define a cylindrical casing surface of revolution.

Alternatively, in a non-shown embodiment, the fastener comprising a thread is a threaded rod or a stud.

By way of illustration, FIG. 10, which will be described more precisely below, shows a micrographic photograph in cross-section of a thread 14 comprising a series of thread crests 22 and thread bottoms 24. The core 26 of a thread is indicated by a box.

FIG. 13, which will be described more precisely below, shows a cut of a portion of a fastener 110 according to a second embodiment of the invention. The fastener 110 is a nut, of which an inner surface 113, which is substantially cylindrical of revolution, comprises a serrated shape 114 consisting of an internal thread. The surface 113 is considered to be "substantially cylindrical of revolution" in the direction in which the crests 132 of the threads define a cylindrical envelope surface of revolution. As an indication, the shape of the nut 110 is similar to that of the nuts described in document FR2947597, on behalf of the applicant.

In another embodiment not shown, the serrated shape of the fastener is formed by a plurality of parallel annular traction grooves adjacent the axis of the fastener. Such traction grooves are particularly described in the EP1492961 document.

The fastener 10, 110 is made of a beta-metastable titanium alloy.

Figure 2:
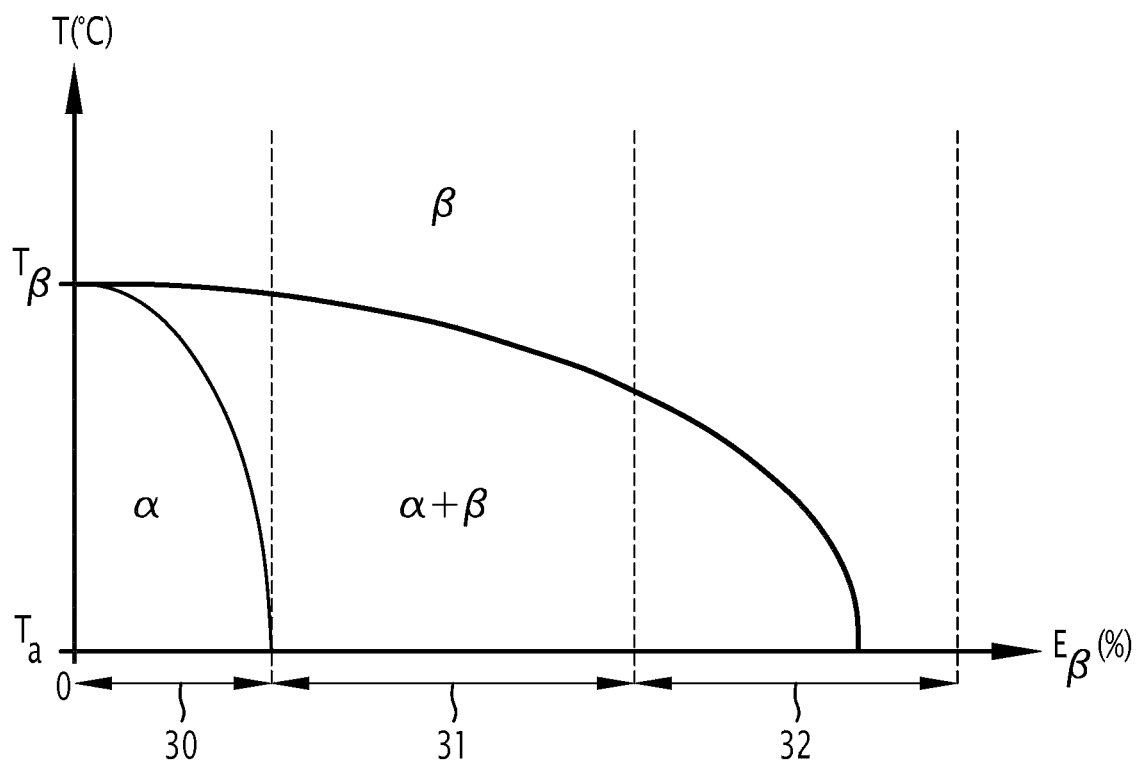
FIG. 2 is a graphical representation of a classification of titanium alloys.

More specifically, the titanium alloys can be classified into three families 30, 31, 32 according to their phase proportion alpha ($\alpha$) or beta ($\beta$) present at room temperature. FIG. 2 shows the distribution of these three families 30, 31, 32 as a function of the temperature T and the percentage E$\beta$ of betagene elements in the titanium. The ambient temperature Ta is, for example, of the order of 20° C.

The family 30 is the one of $\alpha$ and quasi $\alpha$ alloys. These alloys contain few addition elements in titanium. These elements are in particular alphagene elements, i.e. promoting the formation of the alpha phase. Alphagene elements are, for example, aluminum, nitrogen, carbon and oxygen.

The $\alpha$ and quasi-$\alpha$ alloys are characterized by an insensitivity to heat treatments. The microstructure of the $\alpha$ alloys is only composed of phase $\alpha$. The microstructure of the quasi-$\alpha$ alloys is composed of phase $\alpha$ with a low proportion of phase $\beta$.

The family 31, to which the TA6V belongs, is the $\alpha$+$\beta$ alloy family. These alloys contain betagene elements promoting the maintenance of a minority of phase $\beta$ at room temperature.

Two types of betagene elements are distinguished: The beta-isomorphic elements, miscible in any proportion in phase $\beta$, comprise hydrogen (H), molybdenum (Mo), vanadium (V) and niobium (Nb). The beta-eutectoid elements, which are capable of forming precipitates, include manganese (Mn), chromium (Cr), silicon (Si), nickel (Ni), copper (Cu), and iron (Fe), which has the strongest betagene power.

The family 32 is the family of quasi-$\beta$ or $\beta$-metastable or beta-metastable alloys. The alloys of which the fasteners according to the invention are formed belong to the family 32.

These beta-metastable alloys contain a proportion of betagene elements promoting the maintenance of a $\beta$ phase in an amount greater than the $\alpha$+$\beta$ alloys and the presence of an a phase in a lesser amount than in $\alpha$+$\beta$ alloy.

After performing hardening heat treatments, the beta-metastable alloys may have high tensile strength, about 1250-1500 MPa.

On the other hand, as seen in FIG. 2 and as it will be mentioned subsequently, titanium and each titanium alloy have a T$\beta$ temperature called "beta transus". This temperature T$\beta$ corresponds to a transformation temperature of the alpha-phase in beta-phase. For pure titanium, the transus beta temperature is about 882° C.

Preferably, the beta-metastable titanium alloys used in the context of the invention have the following composition in weight: between 4 and 6% of aluminum, between 4 and 6% of vanadium, between 4 and 6% of molybdenum and between 2 and 4% of chromium. The remainder of the alloy is composed of titanium and optionally one or more addition elements such as iron or zirconium. In this case, each of the addition elements has a weight percentage of less than 3%, the sum of the weight percentages of said addition elements remaining less than 6%.

Figure 3:
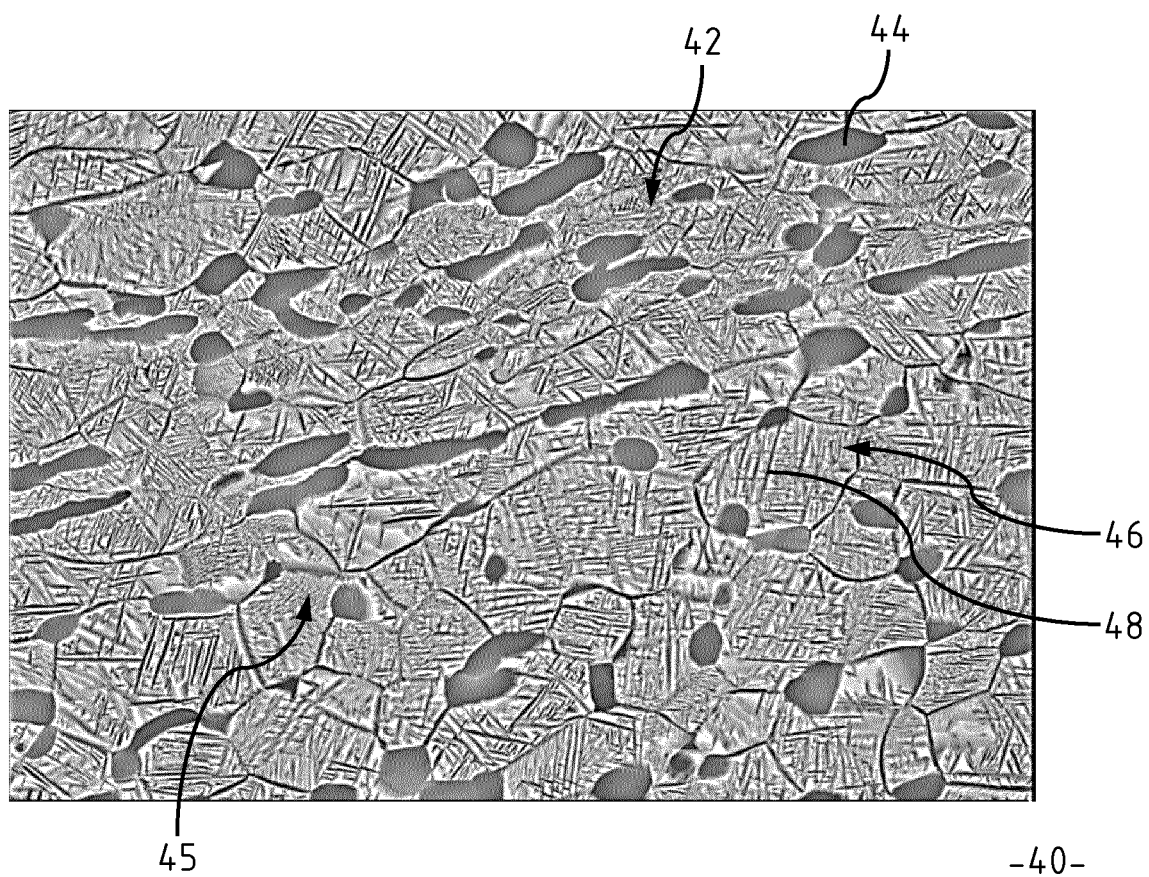
FIG. 3 is a micro-scale photograph of a microstructure of a beta-metastable titanium alloy forming a fastener according to an embodiment of the invention.

FIG. 3 shows a microstructure 40 of a beta-metastable titanium alloy used in the context of the invention. The microstructure 40 comprises a matrix 42 and nodules 44 of alpha phase, or primary alpha ($\alpha_p$), distributed in said matrix.

The matrix 42 consists of beta-phase 45 as well as colonies 46 of alpha-phase lamellae 48, or secondary alpha ($\alpha_s$). A colony 46 of lamellae 48 corresponds to a group of lamellae 48 close to and oriented in the same direction.

A plurality of screws 10 as described above have been subjected to metallographic analyses. Each screw belongs to a batch A, B, C, D, E. Said batches differ by their method of processing the beta-metastable titanium alloy. Examples of methods will be described later.

Figure 4:
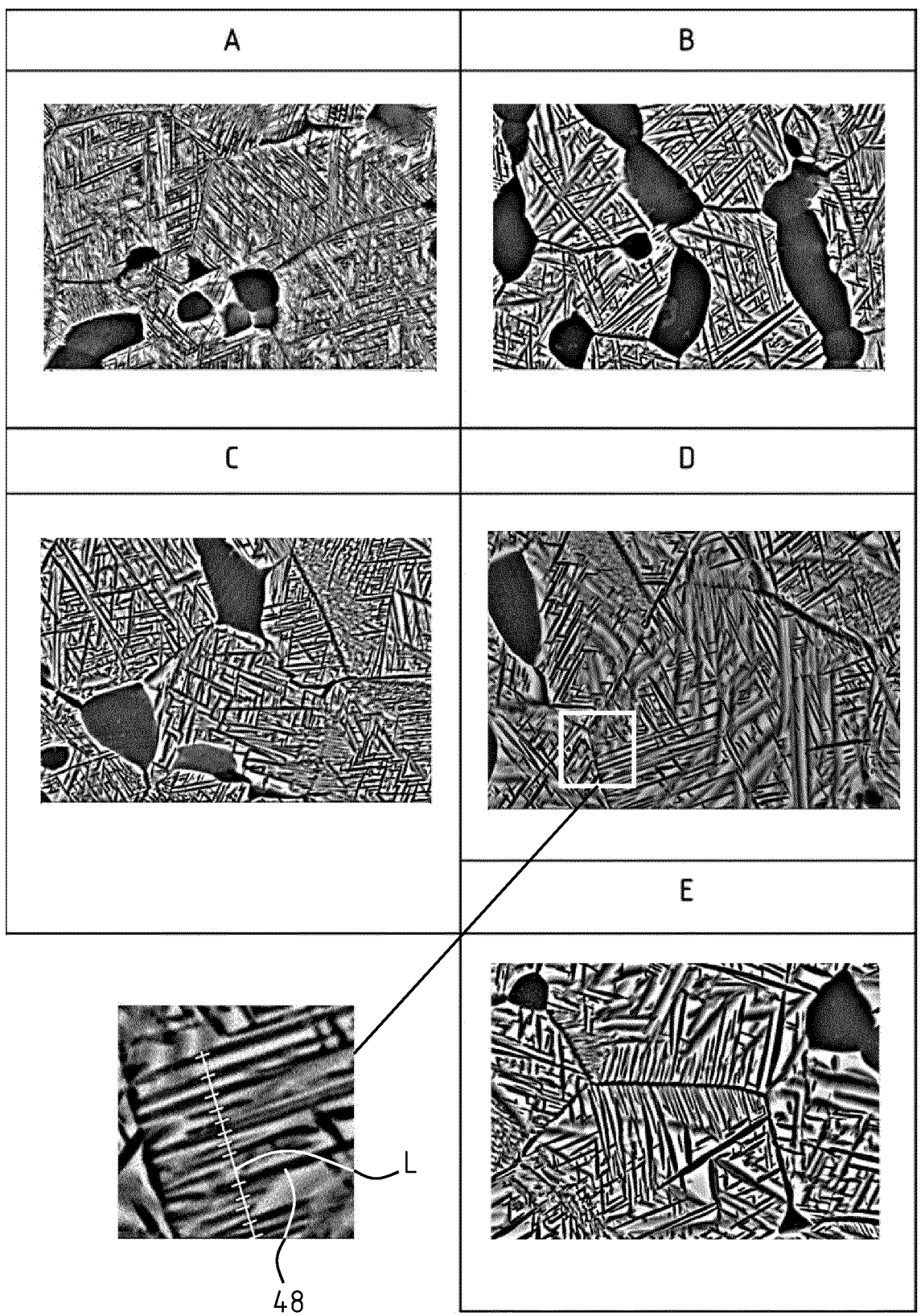
FIG. 4 is a micro-scale photograph set of microstructures of beta-metastable titanium alloys forming fasteners according to different embodiments of the invention.

FIG. 4 shows images to the scanning electron microscope taken in the core 26 of the threads of a screw of each of the batches A to E. The scale used is of 1 μm for the micrographs of the screws B to D and of 2 μm for the micrographs of the screws A and E.

The lamella colonies 46 are visible and randomly oriented in the matrix β 45 for the five batches.

The microstructure 40 of each of the screws A to E has been characterized, in particular by measuring an average distance Dm between the lamellae 48 of the colonies 46.

An example method of measuring Dm, used herein, comprises the steps described below:

A first step is the cut in the longitudinal direction of a screw 10; then coating, polishing and etching the cut, for example with hydrofluoric acid 2%, to highlight the microstructure of the screw.

In a second step, at least one and preferably ten photographs of the microstructure are taken to the scanning electron microscope, for example at magnification ×10 000. Such photographs are presented in FIG. 4.

An image analysis is then performed by tracing on each image a line L within at least two colonies of lamellas $\alpha_s$ 48 (FIG. 4) so that the line is perpendicular to a largest number of lamellas as possible, and then counting the number of lamellas as intercepted by these lines, and finally dividing the length of each line by the number of lamellas as intercepted. Thus, line L of FIG. 4 measures 1.7 μm and intercepts thirteen lamellae of a same colony, meaning an inter-lamellar distance of 0.13 μm.

An average of ten images with about seven lines per image provides a reliable and reproducible measurement.

For screws A, it is visually observed that the lamellas $\alpha_s$ 48 are very thin and tightened. The screws B, C and D have finely divided and spaced-apart lamellas. The screws E have relatively coarse lamellas as well.

Figure 5:
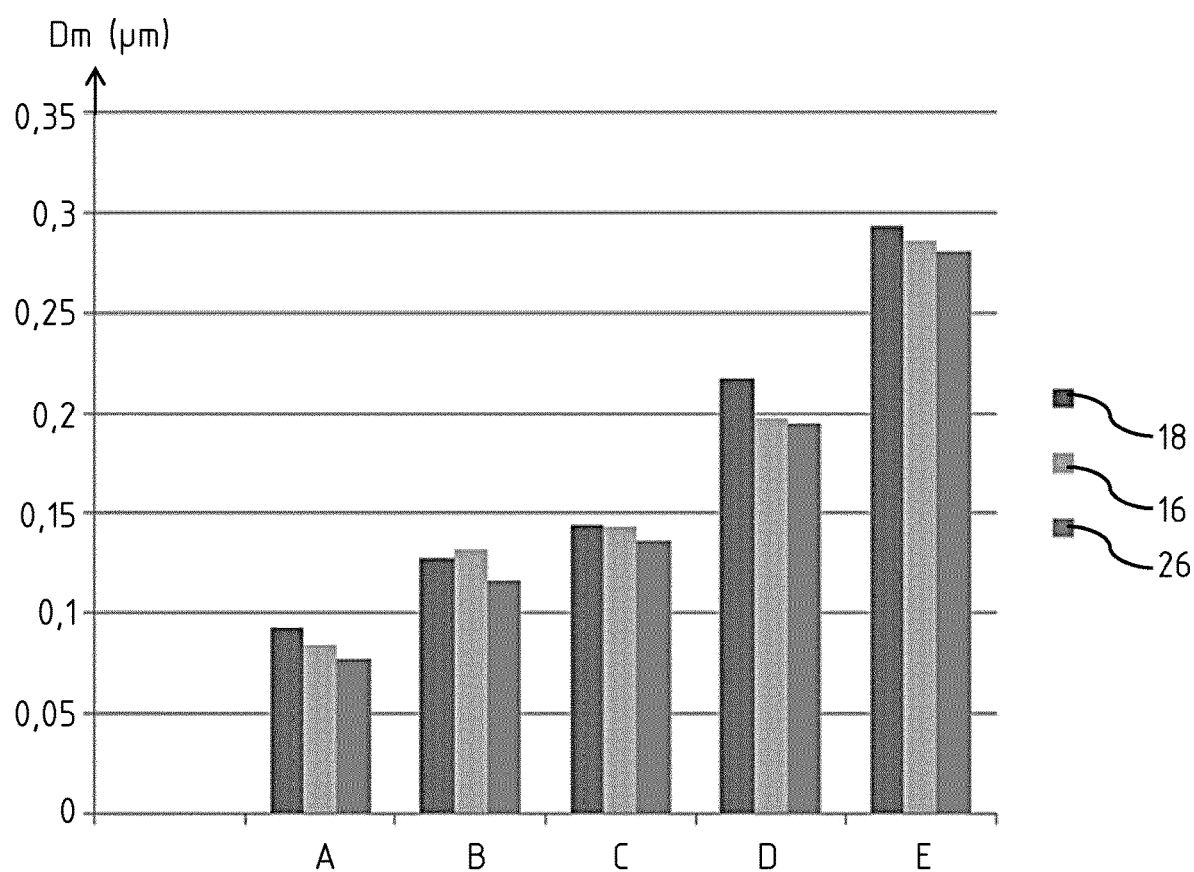
FIG. 5 is a graphical representation of a distance between lamellae of the microstructures of FIG. 4.

The inter-lamellar distances Dm also have been measured on cut images made in the head 16, the shank 18 and the core 26 of the threads 14 in order to identify a possible effect of the method on the inter-lamellar distance. Indeed, each portion of the screw 10 has undergone a different deformation, since the head 16 is forged, the shaft 18 is machined, and the threads 14 are rolled. The results of these measurements are shown in FIG. 5. It is noted that for each batch A to E, the methods of manufacture slightly reduces the distance between the lamellas as likely due to the applied compressive deformation.

The screws A, B, C, D, E have been subjected to mechanical tests to determine their mechanical performance. Test specimens of the same diameter are also made for the material of each batch according to the standard ASTM E8.

During tension tests, the fracture of the screws is carried out in the threads, while the fracture of the tension test samples is carried out in the smooth central portion.

The results are represented in table 1:

The average of the tensile strengths of the screws B, C and D is greater than 1350 MPa and a ductility greater than 10%, enough to deform the material without creating a defect in the threads.

The material of the screws E has a lower tensile strength than the other batches, of the order of the tensile strength of a TA6V fastener.

The fatigue limit is changed from 410 MPa for the screw A to 460-500 MPa for the screws B to D. However, a standard deviation of approximately 20 MPa is observed for the tensile strength measurements of the screws B to D. On the contrary, for the screw A, the standard deviation is about 120 MPa due to the brittleness of the material and the defects created during the shaping by deformation.

The distance Dm between the lamellas as therefore appears proportional to the tensile strength of the material and inversely proportional to its ductility.

It results from the previous tests and measurements that the lamellas $\alpha_s$ 48, spaced apart by an average distance Dm less than 0.08 μm, lead to too brittle material. This follows three adverse consequences: degradation of the ability of the material to be shaped by deformation, lowering of the fatigue limit, increasing the dispersion of the tensile strength measurements.

Conversely, lamellae spaced apart by an average distance Dm greater than 0.30 μm result in a material having a mechanical strength of less than 1240 MPa, thus quite close to the TA6V alloy, which reduces the interest of the use of a β-metastable alloy.

In the microstructure 40, it is therefore preferable that an average distance Dm between the lamellas $\alpha_s$ 48 within a colony 46 is between 0.08 μm and 0.30 μm.

The area percentage Pn of nodules 44 also has been measured on the microstructures 40 of the screws A, B, C, D and E. The measurement method first comprises the steps of cutting, processing and photographing similar to those described above. The photographs are for example carried out with a magnification ×2000.

Figure 6:
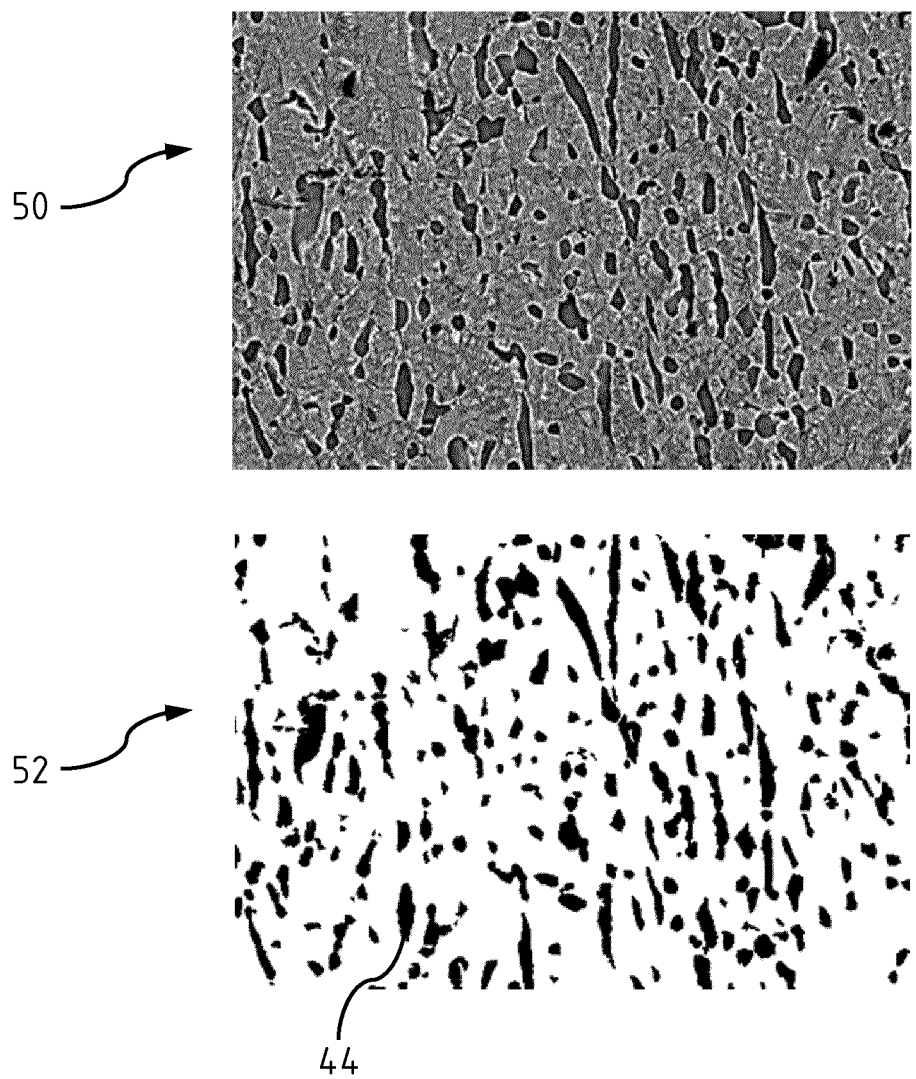
FIG. 6 shows micrometric photographs of microstructures of a fastener according to one embodiment of the invention, with and without image processing.

Image analysis is then performed by a "ImageJ" type software to extract the nodules 44 by image thresholding and then calculate the cumulative surface with respect to the total observation surface. FIG. 6 shows two photographs 50 and 52, respectively before and after image processing.

Figure 7:
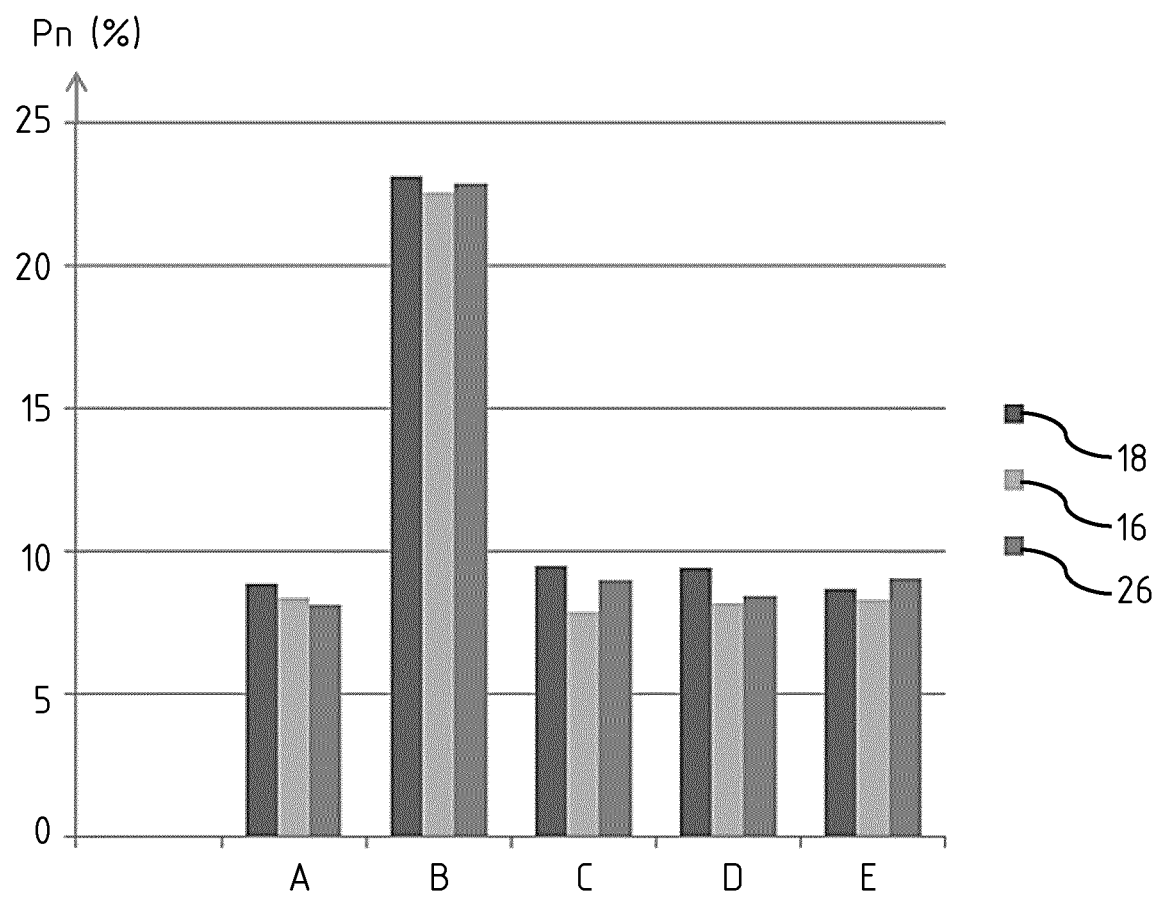
FIG. 7 is a graphical representation of measurements made on the microstructures of FIG. 6.

An average of ten images provides a reliable and reproducible measurement. The results of the measurements are shown in FIG. 7. For the five batches A, B, C, D and E, the area percentage Pn of nodules $\alpha_p$ is generally regular regard-

TABLE 1

|  | A | B | C | D | E |
| --- | --- | --- | --- | --- | --- |
| Tensile Strength Rm of samples (MPa) | 1554 +/− 5 | 1435 +/− 7 | 1343 +/− 6 | 1340 +/− 4 | 1270 +/− 6 |
| Samples elongation (%) | 10 | 15.2 | 15.6 | 17.6 | 24 |
| Tensile strength Rm of screw threads (MPa) | 1402 +/− 59 | 1403 +/− 6 | 1413 +/− 9 | 1360 +/− 8 | 1256 +/− 8 |
| Fatigue limit of threads (staircase method) | 410 | 504 | 493 | 462 | 385 |
| Average distance between lamellas $\alpha_s$ in threads core (μm) | 0.06 | 0.12 | 0.14 | 0.19 | 0.28 |
| % nodules | 8 | 8 | 22 | 7 | 8 | less of the area of interest, either the shank 18, the head 16 or the thread core 26. Therefore, the manufacturing methods do not appear to substantially affect the amount of nodules.

Between the batch B and the batch C, the percentage of nodules 44 varies greatly but the mechanical properties are identical, to the standard deviation of measurements. The area percentage Pn of nodules 44 therefore does not appear to be paramount to ensure good mechanical properties. On the other hand, a homogeneous distribution of the size and position of the nodules within the material appears to be important to ensure homogeneous mechanical properties.

A method for manufacturing a beta-metastable titanium alloy fastener 10, 110 according to the invention will be described below. As detailed, the method includes first and second heat treatment on a semi-finished beta-metastable titanium alloy material.

However, other methods also provide for a microstructure according to the invention, such as the above-described microstructure 40.

Figure 8:
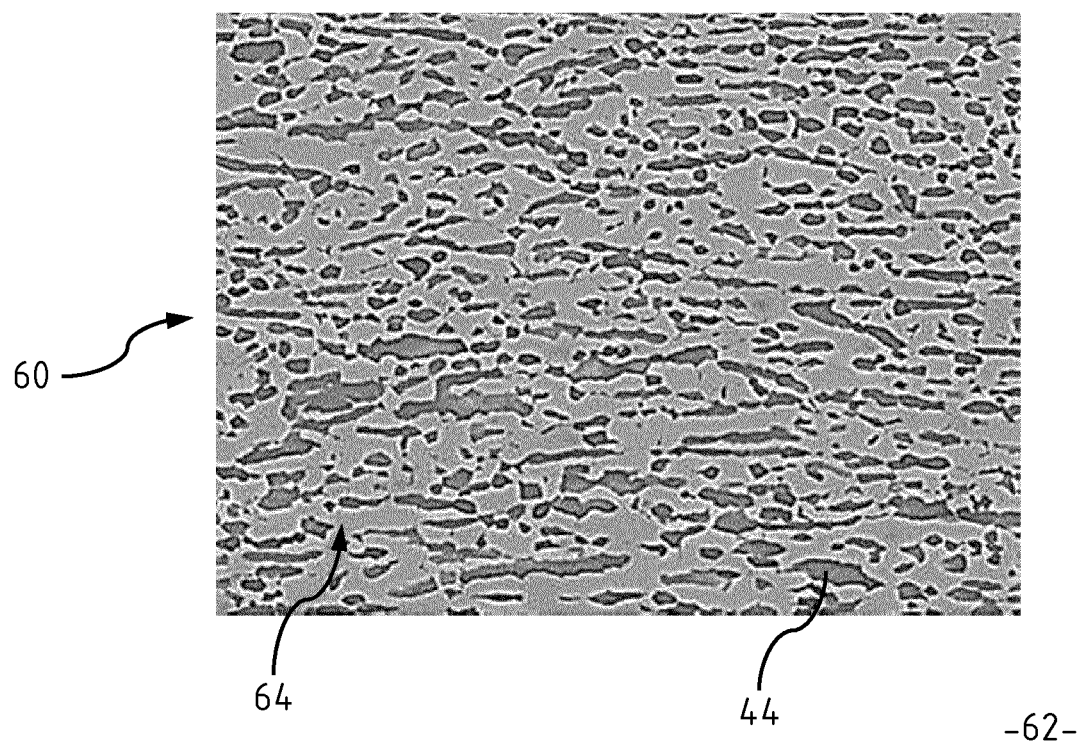
FIG. 8 is a micro-scale photograph of a microstructure of a beta-metastable titanium alloy forming a semi-finished material, used in a fastener manufacturing method according to an embodiment of the invention.

FIG. 8 shows a microstructure 60 of a fastener blank 62 made of a beta-metastable titanium alloy, or semi-finished material, used for the manufacture of the fastener 10, 110.

At room temperature, the microstructure 60 of the semi-finished material includes a beta-phase matrix 64 in which are distributed alpha-phase nodules $\alpha_p$ 44, visible in dark grey in FIG. 8. The nodules 44 are uniformly distributed in the beta-phase.

Although the area percentage Pn of nodules 44 is not paramount, it is preferably comprised between 4 and 40% in the microstructure 60.

Indeed, subsequent heat treatments, described below, will tend to decrease the percentage of nodules $\alpha_p$. If the semi-finished material comprises less than 4% of such nodules, the material after the heat treatments will be very brittle because almost free of nodules $\alpha_p$. This will be detrimental to the subsequent steps of deformation, rolling or crimping of the threads, and will lower the final mechanical properties of the fastener, in particular in fatigue.

Conversely, if the semi-finished material comprises more than 40% of nodules $\alpha_p$, the material will have low mechanical strength after heat treatments, due to the too large percentage of nodules $\alpha_p$.

The method 200 for manufacturing the fastener 10, 110 from the fastener blank 62 comprises, for example, the following steps, illustrated in FIG. 9.

A first step 201 is the provision of a fastener blank 62 made of a beta-metastable titanium alloy, having at room temperature a microstructure 60 as described above. In the case of a screw or similar fastener, the fastener blank 62 is, for example, a bar or wire, preferably of a diameter greater than the nominal diameter of the fastener 10 to be manufactured. The bar or wire is in the form of an entire block or, alternatively, is cut into slugs in the first step 201.

In the microstructure 60, the position and distribution of the nodules $\alpha_p$ are defined by the thermomechanical treatments performed by the manufacturer of the semi-finished material. Some of these steps are generally performed at a temperature slightly below the transus beta $T_\beta$ temperature.

A second step 202 is a first heat treatment, aiming to control the size of the nodules $\alpha_p$ and their homogeneous distribution in the matrix β. This step can be carried out by the manufacturer of the semi-finished product or by the manufacturer of the fastener.

The first heat treatment of step 202 is preferably performed at a temperature between $(T_\beta-100°$ C.) and $(T_\beta-10°$ C.). Although the precise influence of the size, distribution and number of nodules $\alpha_p$ on the mechanical properties is not well understood by the scientific community, the tests of the applicant have shown that this temperature range is most favorable for subsequent application of the second heat treatment. The most probable explanation would be as follows:

if the first heat treatment is carried out at a temperature too close to the transus temperature beta $T_\beta$, dissolution of the nodules $\alpha_p$ is too large and the material is too brittle at the threads after the second heat treatment; and if the first heat treatment is carried out at a temperature too far from the transus temperature beta $T_\beta$, the dissolution of the nodules $\alpha_p$ is not enough and the material is not sufficiently strong at the threads after the second heat treatment.

The first heat treatment is followed by cooling of the fastener blank 62. Unlike the TA6V alloy, the β-metastable titanium alloy enables the use of ambient air cooling and its heat treatment is effective even for thicknesses of more than 25 mm, which offers the possibility of making large-diameter fasteners while maintaining high mechanical properties.

Cooling may also be performed faster in a quench media, such as, for example, water, oil, or a mixture of water and polymer, to accelerate production rates and without adversely impacting the efficiency of heat treatment.

A third step 203 is a second heat treatment performed after the first heat treatment. Said second heat treatment aims at controlled precipitation of alpha-phase lamellae 48 in phase β, while maintaining a certain quantity of nodules $\alpha_p$ 44.

Preferably, the second heat treatment is carried out at a temperature between 440° C. and 600° C., more preferably between 450° C. and 580° C.

The interest of this temperature range is to achieve the best possible mechanical strength while maintaining sufficiently high ductility such that future mechanical deformation does not cause cracking.

The influence of the temperature of the second heat treatment on the mechanical properties is that, for an equivalent duration, the higher the temperature, the more the lamellas $\alpha_s$ are closed and the higher the mechanical strength of the material and the lower the ductility.

Conversely, the higher the temperature, the more the lamellas $\alpha_s$ are spaced apart and the greater the mechanical strength of the material is low and its ductility is large.

The duration of the second heat treatment is preferably between 1 h and 20 h. This duration has a second order importance, but a longer duration will tend to have the same effect on the microstructure and mechanical properties that a higher temperature.

The second heat treatment may be followed by air cooling or quenching media as described above. Alternatively, the treated material undergoes hot deformation before being completely cooled, for example at a temperature lower than the temperature of the second heat treatment.

A fourth step 204 is a deformation operation of a portion of the fastener blank 62, in particular in order to achieve the serrated shape 14, 114 of the fastener.

The fourth step 204 comprises, for example, a rolling operation of the threads 14 for a screw 10, or of local deformation of the internal threads 114 for a nut 110, commonly referred to as "crimping".

The deformation operation can be performed at room temperature or at hot temperature to increase ductility, by selecting the temperature so as not to modify the microstructure obtained after the second heat treatment.

For screws or similar fasteners, the heating or crimping temperatures of the threads are preferably less than 620° C. A higher temperature would cause to alter the microstructure obtained after the second heat treatment. This alteration, characterized by a decrease in microhardness (see Table 7 below), is little visible in metallography but is explained by a decrease in the texture and/or elastic energy stored in the material.

The rolling operation of the threads can be performed according to several methods. The thread rolling by means of reciprocating flat dies makes it possible to roll at room temperature threads of small nominal diameter, for example less than 6 mm. The thread rolling by means of profiled rolls is particularly used for the rolling of threads of the largest nominal diameters, for example greater than 6 mm.

Preferably, the portion 20 of the screw intended to be rolled by profiled rolls is heated before rolling. In this case, the heating temperature is preferably less than 620° C. to avoid altering the microstructure. Although this alteration is not always visible on the microstructure of the part, the mechanical properties are degraded, with a smaller average of mechanical strength and a standard deviation of values.

In the case of the crimping of a nut, the choice of temperature is for example carried out according to the method described in document FR2947597, previously cited. The heating temperature for crimping is preferably kept below 620° C.

Alternatively to the method described above, the deformation step 204 is carried out before the second heat treatment 203, in particular for crimping a nut 110.

The combination of the first and second heat treatments especially makes it possible to obtain fasteners 10, 110 having a tensile strength Rm greater than 1250 MPa. The fasteners nevertheless maintain a ductility greater than 10% to allow deformation of the material by rolling or crimping by avoiding the creation of defects in the threads.

The standard deviation is low, since less than 5% of the tensile strength Rm. The mechanical strength of the threads thus created is thus maximum, reliable and reproducible, and the material does not contain any detrimental defects.

Optionally, the manufacturing method described above further comprises one or more first steps 205 of shaping the fastener blank 62 before the first heat treatment step 202.

Such a first shaping step 205 is for example a forging of one end of a slug to manufacture a screw head, or forge the outer shape of a nut.

Alternatively, a first shaping step 205 comprises machining the surface 113 of a nut to make the tapping 114 intended to be subsequently crimped.

Optionally, the manufacturing method described above further comprises one or more second steps 206 of shaping the fastener blank 62 after the second heat treatment step 203 and before the deformation step 204.

Such a second shaping step 206 is intended, for example, to set the diameter of the smooth barrel 18 of a screw between the head 16 and the end portion 20 intended to be subsequently threaded.

Alternatively, a second shaping step 206 comprises machining the surface 113 of a nut to make the tapping 114 intended to be subsequently crimped.

Alternatively, a second shaping step 206 includes machining an outer surface of the fastener 10, 110 so as to remove an optional oxidation layer formed on the surface of the workpiece. This variant makes it possible to better control the deformation temperature of the fastener when the temperature measurement is carried out by pyrometry, since the surface state is uniform.

Optionally, the manufacturing method described above further comprises a step 207 of coating the fastener member 10, 110 after the deformation step 204. The coating may be on all or only a portion of the surface of the fastener, such as threading or tapping. An example usable coating is an aluminum coating against galvanic corrosion of the HI-KOTE™ type sold by the company Hi-Shear, described in patent EP2406336.

Optionally, additional manufacturing or control steps may be performed between steps 201, 202, 203, 204 described above.

Fasteners 10, 110 according to the invention have been produced and compared to separate fasteners of the invention. The results are described below.

EXAMPLE 1

A wire of 4.7 mm in diameter, made of alloy sold under the designation Ti-18, is provided and cut into slugs. The studied batch of material Ti-18 has a transus temperature beta $T_\beta$ equal to 863° C. and a chemical composition comprising 5.6% Aluminum, 5% Molybdenum, 5% Vanadium, 2.5% Chromium, 0.85% Iron, as well as other addition elements each counting up to less than 0.2% by weight, and the sum of these elements counting for less than 3% by weight. The remainder of the composition is composed of titanium.

A first heat treatment is performed at the temperature of $(T_\beta-85°\,C.)$ for 2 h followed by water cooling. A second heat treatment is performed at 460° C. for 8 h, followed by air cooling.

The rolling of the threads is carried out with reciprocating flat dies at room temperature. The screws obtained are referred to as screws F.

TA6V screws of the same diameter, called screws G, are manufactured as a comparison element. The manufacture is carried out according to standard manufacturing processes, or a subsequent heat treatment AMS4967 followed by a rolling with reciprocating flat dies.

Test specimens of the same diameter are also made for both materials as a control of the good performance of the heat treatment.

During tension tests, the fracture of the screws is carried out in the threads, while the fracture of the test samples is carried out in the smooth central portion. The results are presented in Table 2.

TABLE 2

|  | Screw G | Screw F | Standard deviation absolute value (%) |
|---|---|---|---|
| Tensile strength Rm of test samples (MPa) | 1204 +/− 9 | 1526 +/− 7 | 14<br><1% |
| Tensile strength Rm of screws (MPa) | 1196 +/− 11 | 1521 +/− 6 | 12<br><1% |
| Double shear on smooth central portion of test samples (MPa) | 779 +/− 7 | 848 +/− 7 | 14<br>1.7% |
| Fatigue limit (MPa) | 386 | 452 | — |

The tests show that the values of the tensile strength Rm, the double shear and the fatigue limit of the Ti-18 fasteners manufactured with the heat treatments and the rolling temperature of the invention are much higher than comparable TA6V screws.

The standard deviation is very low, indicating that the results obtained are reproducible.

The tensile strength values in the threads are comparable to the resistance values of the test specimens, which means that rolling has no adverse effect on the material.

FIG. 10 mentioned above shows a micrographic photograph of a thread 14 of the screw F. The inspection of the threads does not show any major defect.

EXAMPLE 2

A wire of 8 mm in diameter, made of alloy sold under the designation Ti-55531, is provided and cut into slugs. The studied material batch Ti-55531 has a transus temperature beta $T_\beta$ equal to 838° C. and a chemical composition comprising 4.5% Aluminum, 5% Molybdenum, 5.1% Vanadium, 2.7% Chromium, 1, 2% Zirconium, 0.4% Iron, other addition elements each counting up to less than 0.2% by weight, and the sum of these elements counting for less than 3% by weight. The remainder is made of titanium.

A first heat treatment is performed at the temperature of $(T_\beta-30°$ C.) during 1 h followed by air cooling. A second heat treatment is performed at 530° C. for 8 h, followed by air cooling. The rolling of the threads is performed manually with profiled rolls with a rolling temperature of 520° C. at a single end to manufacture a 8 mm diameter screw. The screws obtained are referred to as screws H.

TA6V screws of the same diameter, referred to as J screws, are manufactured as a comparison element. The manufacture is carried out according to standard manufacturing processes, or a subsequent heat treatment AMS4967 followed by rolling at 400° C.

Test specimens of the same diameter are also made for both materials as a control of the good performance of the heat treatment.

During tensile testing, the fracture of the screws is carried out in the threads, while the fracture of the test specimens is carried out in the smooth central portion. The results are presented in Table 3.

TABLE 3

|  | Screw J | Screw H | Standard deviation Absolute value (%) |
| --- | --- | --- | --- |
| Tensile strength Rm of test samples (MPa) | 1170 +/− 7 | 1435 +/− 7 | 14<br><1% |
| Threads tensile strength Rm (MPa) | 1160 +/− 10 | 1403 +/− 6 | 12<br><1% |
| Double shear on smooth central portion of test samples (MPa) | 770 +/− 6 | 791 +/− 8 | 16<br>2% |
| Fatigue limit (MPa) | 380 | 504 | — |

The tests show that the values of the tensile strength Rm, the double shear and the fatigue limit of the Ti-55531 fasteners manufactured with the heat treatments of the invention are much higher than comparable TA6V screws.

The standard deviation is very low, indicating that the results obtained are reproducible.

The tensile strength values in the threads are comparable to the tensile strength values of the test samples, meaning that the rolling has no adverse effect on the material. Furthermore, inspection of the threads by micrography does not show any major defect.

EXAMPLE 3

A 8 mm alloy wire of Example 2 is cut into slugs. A first heat treatment is performed at the temperature of $(T_\beta-30°$ C.) for 2 h followed by air cooling. A second heat treatment is performed at 430° C. for 8 h, followed by air cooling. The rolling of the threads is performed manually by profiled rolls with a rolling temperature of 520° C. at a single end to manufacture a 8 mm diameter screw. The screws obtained are referred to as the K screws.

TA6V screws of the same diameter (screw L) are manufactured according to the standard manufacturing methods of Example 2 as a comparison element. Test specimens of the same diameter are also made for both materials as a control of the good performance of the heat treatment.

During tensile testing, the fracture of the screws is carried out in the threads, while the fracture of the test specimens is carried out in the smooth central portion. The results are presented in Table 4.

TABLE 4

|  | Screw L | Screw K | Standard deviation Absolute value (%) |
| --- | --- | --- | --- |
| Tensile strength Rm of tess samples (MPa) | 1170 +/− 7 | 1554 +/− 5 | 10<br><1% |
| Threads tensile strength Rm (MPa) | 1160 +/− 10 | 1402 +/− 59 | 118<br>8.4% |
| Double shear on smooth central portion of samples (MPa) | 770 +/− 6 | 864 +/− 9 | 18<br>2% |
| Fatigue limit (MPa) | 380 | 410 | — |

The tests show that the values of the tensile strength Rm, the double shear and the fatigue limit of the Ti-55531 fasteners manufactured with the heat treatments of the invention are superior to comparable TA6V screws.

However, a significant reduction of more than 150 MPa is noted between the tensile strength of the test sample material and the tensile strength of the rolled threads. Also, the standard deviation of the resistance of the rolled threads is very high (greater than 8%) and the fatigue limit is relatively low relative to the strength of the material.

These three factors indicate that rolling has had an adverse effect on the material. The probable reason is a too low ductility of the material prior to rolling, due to the too low temperature of the second heat treatment.

As can be seen in FIG. 11, the rolling has generated important cracks 70, 72 in the tops of threads 22 as in the bottom of thread 24. These defects compromise the integrity of the fastener since the cracks can generate crack departures and lead to the performance of low-reproducible fasteners, which is unacceptable for aeronautical fasteners.

EXAMPLE 4

A wire of diameter 8 mm in alloy of Example 2 is cut into slugs. A first heat treatment is performed at the temperature of $(T_\beta-45°$ C.) for 1 h followed by water cooling. A second heat treatment is performed at 460° C. for 8 h, followed by air cooling.

The rolling of the threads is carried out manually by profiled rolls with several rolling temperatures TR between 550° C. and 650° C. at one end to make a screw of 4.7 mm in diameter. The tensile strength Rm and the conventional 0.2% plasticity limit Rp are measured, the break occurring in the threads.

The results are shown in FIG. 12. The tensile strength of the threads is about 1500 MPa for a heating temperature prior to rolling up to the temperature of 620° C. Beyond, and although the threads have a visual appearance that improves with the rise of heating temperature before rolling, the mechanical properties are greatly lowered because the heating temperature before rolling, above 620° C., has altered the microstructure formed during the second heat treatment.

EXAMPLE 5

A 8 mm alloy wire of Example 2 is cut into slugs. A first heat treatment is performed at the temperature of $(T_\beta-30°$ C.) during 1 h followed by air cooling. A second heat treatment is performed at 530° C. for 8 h, followed by air cooling.

The slugs are then machined to manufacture a six-sided nut (nut M). Crimping of the threads is performed with a crimping temperature of 520° C. on three sides of the nut.

TA6V nuts of the same diameter (nut N) are manufactured as a comparison element. The production is carried out according to standard manufacturing methods, that is to say the thermal treatment of AMS 4967 followed by crimping at 470° C. Test specimens of the same diameter are also made for both materials as a control of the good performance of the heat treatment.

During tensile testing, the fracture of the nuts is carried out in the threads, while the fracture of the test specimens is carried out in the smooth central portion. The results are presented in Table 5.

TABLE 5

|  | Nut N | Nut M | Standard deviation Absolute value (%) |
|---|---|---|---|
| Tensile strength Rm of test samples (MPa) | 1170 +/− 7 | 1435 +/− 7 | 14 <1% |
| Nut tensile strength (thread fracture) (MPa) | 1164 +/− 10 | 1432 +/− 9 | 18 1.25% |
| Average hardness in non-crimped zone (HV) | 363 +/− 10 | 390 +/− 14 | 28 |
| Average hardness in crimped zone (HV) | 357 +/− 12 | 387 +/− 12 | 24 |

The results obtained are therefore reproducible and much higher than those of TA6V. The nut M is the nut 110 shown in FIG. 13 mentioned above. The tapping 114 has thread tops 132 and thread bottoms 134 that do not have cracking-like defects.

The tests show that the values of the tensile strength Rm, and the hardness of the Ti-55531 fasteners manufactured with the heat treatments of the invention are much greater than those of comparable TA6V nuts. The standard deviation is very low, indicating that the results obtained are reproducible.

The tensile strength values in the threads are comparable to the resistance values of the test specimens and the hardness values in the crimped zone are comparable to the hardness values in the non-crimped zone, meaning that the crimping has no adverse effect on the material.

The results obtained are therefore reproducible and much higher than those of TA6V fasteners.

EXAMPLE 6

A 8 mm alloy wire of Example 2 is cut into slugs. A first heat treatment is performed at the temperature of $(T_\beta-30°$ C.) during 1 h followed by air cooling. A second heat treatment is performed at 430° C. for 8 h, followed by air cooling.

The slugs are then machined to manufacture a six-sided nut (nut O). Crimping of the threads is performed with a crimping temperature of 520° C. on three sides of the nut.

TA6V nuts of the same diameter (nut P) are manufactured according to the standard manufacturing methods of Example 5 as a comparison element.

Test specimens of the same diameter are also made for both materials as a control of the good performance of the heat treatment.

During tensile testing, the fracture of the nuts is carried out in the threads, while the fracture of the test specimens is carried out in the smooth central portion. The results are presented in Table 6.

TABLE 6

|  | Nut P | Nut O | Standard deviation Absolute value (%) |
|---|---|---|---|
| Tensile strength Rm of test samples (MPa) | 1170 +/− 7 | 1551 +/− 9 | 18 1.1% |
| Threads Tensile strength Rm (MPa) | 1164 +/− 10 | 1332 +/− 44 | 88 6.6% |
| Average hardness in non-crimped zone (HV) | 363 +/− 10 | 429 +/− 9 | 18 4.2% |
| Average hardness in crimped zone (HV) | 357 +/− 12 | 413 +/− 14 | 24 5.8% |

The mechanical properties of the nuts are highly degraded: the average value of the tensile strength could appear interesting, but the standard deviation is very large (greater than 5%), which is typical of a low reproducible process.

An explanation is that the material had a too low ductility prior to rolling, due to the too low temperature of the second heat treatment. The rolling has generated important cracks in the tops of threads as in thread bottoms. An example of a crack 136 at the bottom of the thread 134 is visible in FIG. 14. These defects compromise the integrity of the fastener, the cracks being able to generate crack departures.

EXAMPLE 7

A 8 mm alloy wire of Example 2 is cut into slugs. A first heat treatment is performed at the temperature of $(T_\beta-30°$ C.) during 1 h followed by air cooling. A second heat treatment is performed at 460° C. for 8 h, followed by air cooling.

The slugs are then machined to manufacture a six-sided nut (nut R). The crimping of the threads is carried out with a crimping temperature of 650° C. on three sides of the nut.

TA6V nuts of the same diameter (nut S) are manufactured according to the standard manufacturing methods of Example 5 as a comparison element.

Test specimens of the same diameter are also made for both materials as a control of the good performance of the heat treatment.

During tensile testing, the fracture of the nuts is carried out in the threads, while the fracture of the test specimens is carried out in the smooth central portion. The results are presented in Table 7.

TABLE 7

|  | Nut S | Nut R | Standard deviation Absolute value (%) |
|---|---|---|---|
| Tensile strength Rm of smooth central portions of the batch (MPa) | 1170 +/− 7 | 1551 +/− 9 | 18 1.2% |
| Threads tensile strength Rm (MPa) | 1164 +/− 10 | 1432 +/− 38 | 76 5.3% |
| Average hardness in non-crimped zone (HV) | 363 +/− 10 | 429 +/− 8 | 16 |
| Average hardness in crimped zone (HV) | 357 +/− 12 | 328 +/− 27 | 54 |

At these crimping temperatures, the submicronic scale microstructure is modified, making the material locally less hard. As shown in FIG. 15, the crimped zone 138 has a highly discolored area after etching, which is a sign of the modification of the submicronic microstructure. The mechanical results are therefore lowered and dispersed.

The invention claimed is:

1. A fastening element comprising a substantially cylindrical surface of revolution arranged along an axis, said surface comprising a serrated shape selected from a thread, a tapping and a plurality of traction grooves, said fastener element being made of a beta-metastable titanium alloy, characterized in that the alloy has a first microstructure consisting of a first matrix and nodules of alpha phase distributed in said first matrix, the first matrix consisting of beta-phase and groups of alpha-phase lamellae oriented in the same direction.

2. The fastening element of claim 1, wherein an average distance (Dm) between the lamellas of a same group is between 0.08 μm and 0.30 μm.

3. The fastening element according to claim 1, wherein the beta-metastable titanium alloy comprises by weight between 4 and 6% aluminum, between 4 and 6% vanadium, between 4 and 6% molybdenum and between 2 and 4% chromium.

4. The fastening element of claim 3, wherein the beta-metastable titanium alloy further comprises one or more addition elements, each of said addition elements having a weight percentage of less than 3%, a sum of the weight percentages of said additions elements being less than 6%.

5. A method for manufacturing a fastening element according to claim 1, said method comprising the steps of:
   providing a fastener blank made of a beta-metastable titanium alloy, said alloy having a second microstructure consisting of a second matrix of beta phase and alpha-phase nodules distributed in said second matrix, said alloy having a temperature ($T_\beta$) of transformation of the alpha-phase alpha phase;
   first heat treatment of the fastener blank, at a first temperature in a range [$T_\beta$−100° C.; $T_\beta$−10° C.], followed by cooling; then
   second heat treatment of the fastener blank, at a second temperature of between 440° C. and 600° C.;
   the method further comprising a step of deforming the fastener blank to perform the serrated shape, after the first heat treatment.

6. The manufacturing method according to claim 5, wherein the second temperature of the second heat treatment is between 450° C. and 580° C.

7. The manufacturing method according to claim 5, wherein the second microstructure has a surface percentage (Pn) nodules of alpha phase comprised between 4% and 40%.

8. The manufacturing method according to claim 5, wherein the deformation step is performed at a temperature below 620° C.

9. The manufacturing method according to claim 5, wherein the fastening element comprises a thread and the deformation step is carried out by rolling the fastener blank by means of combs or a thumbwheel.

10. The manufacturing method according to claim 5, wherein the fastening element comprises an internal thread and the deformation step is carried out by crimping at least one internal thread of said internal thread.

* * * * *